Jan. 19, 1965   J. W. AGER, JR., ET AL   3,166,597
ORGANOBORON ALCOHOLS AND METHOD FOR THEIR PREPARATION
Filed March 25, 1959
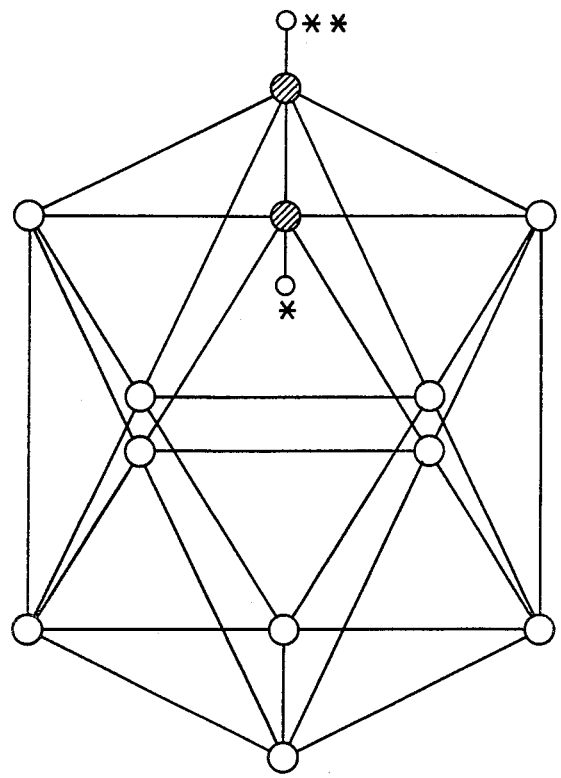
○ BORON
▨ CARBON
○ HYDROGEN ON CARBON
(HYDROGEN ATOMS ON
BORON OMITTED FOR
CLARITY)
*INVENTORS*
JOHN W. AGER, JR.
THEODORE L. HEYING
BY
Adams Forward and McLean
ATTORNEYS

United States Patent Office 3,166,597
Patented Jan. 19, 1965

3,166,597
ORGANOBORON ALCOHOLS AND METHOD FOR THEIR PREPARATION
John W. Ager, Jr., Buffalo, and Theodore L. Heying, Tonawanda, N.Y., assignors to Olin Mathieson Chemical Corporation, a corporation of Virginia
Filed Mar. 25, 1959, Ser. No. 801,960
14 Claims. (Cl. 260—606.5)

This invention relates to organoboron alcohols and to a method for their preparation. The organoboron alcohols are prepared by the alkaline hydrolysis of compounds of the class $RR'B_{10}H_8(CR''CR''')$ wherein R and R' are each selected from the class consisting of hydrogen and an alkyl radical containing from one to five carbon atoms, wherein R'' and R''' are each selected from the class consisting of hydrogen, an alkyl radical, and radicals of the class

wherein $R_1$ is a bivalent saturated hydrocarbon radical containing 1 to 8 carbon atoms and $R_2$ is selected from the class consisting of a benzyl radical and alkyl radicals containing 1 to 6 carbon atoms, at least one radical of the class

being present, the total number of carbon atoms in the $R_1$ radical portion of R'' and R''' taken together not exceeding eight. The reaction products prepared by the method of this invention can be either liquid or solid and are useful as fuels.

Compounds of the above class can be prepared by the reaction of decaborane or an alkylated decaborane having 1 to 2 alkyl groups containing 1 to 5 carbon atoms in each alkyl group with an acetylenic ester in the presence of any of a wide variety of amines, ethers, nitriles or sulfides. The acetylenic esters include those of a monocarboxylic acid having from 1 to 6 carbon atoms and an acetylenic monohydric or dihydric alcohol containing from 3 to 10 carbon atoms. The preparation of these compounds is described in application Serial No. 797,809 filed March 6, 1959 of John W. Ager, Jr. et al. For example, the compound

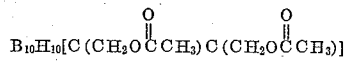

may be prepared from decaborane and butyndiyl-1,4 diacetate at 110° C. in a mixture of diethyl sulfide and diethyl ether. Other suitable organoboron esters include

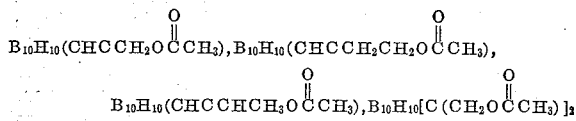

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in application Serial No. 497,407, filed March 28, 1955, by Elmar R. Altwicker, Alfred B. Garrett, Samuel W. Harris and Earl A. Weilmuenster and issued as U.S. Patent No. 2,999,117 on September 5, 1961.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without distintegration when ignited by conventional means, such as a pyrotechnic type igniter, and are mechanically strong enough to withstand ordinary handling.

The liquid products of this invention can be used as fuels according to the method described in the above application Serial No. 497,407. A major advantage of these new liquid products is the high stability they exhibit at elevated temperatures. One of the shortcomings of many high energy fuels is their limited stability at the high temperatures sometimes encountered in their use. The liquid products prepared by the method of this invention, however, exhibit relatively little decomposition even after having been maintained at elevated temperatures for extended periods, thus rendering them well suited for more extreme conditions of storage and use. The liquid products of this invention are also of high density.

In accordance with this invention, it was discovered that organoboron esters of the above class can be hydrolyzed by reaction with a lower alkanol solution of an alkali metal hydroxide to produce organoboron alcohols.

Lower alkanols which can be used are methanol, ethanol, n-propanol, isopropanol, n-butanol, isobutanol, and tertiary butanol, the reactants not being as soluble in the higher alkanols.

Potassium hydroxide is preferred as the alkali metal hydroxide because it is more soluble in the lower alkanol but other alkali metal hydroxides such as sodium and lithium hydroxides can be used.

In the complete absence of water, the ester is hydrolyzed but the alkali metal alcoholate is produced instead of the alcohol. Hence the alkanol solution advantageously contains a small amount of water. The amount of water present should not, however, be so great as to reduce appreciably the solubility of the organoboron ester in the alkali metal hydroxide solution. Separation of the product is then accomplished by acidification of the solution or precipitation of the product from the solution, followed by removal of the product.

The ratio of reactants in the hydrolysis of the organoboron esters can be varied widely, generally being in the range of from 0.01 to 10 moles of alkali metal hydroxide per equivalent of ester (i.e. per mole of carboxylic acid liberated by the hydrolysis) and preferably in the range of from 1 to 6 moles of alkali metal hydroxide per equivalent of ester. Sufficient alcohol can be present to produce a solution containing 1 percent alkali metal hydroxide to a saturated solution of alkali metal hydroxide. The reaction temperature can vary widely, generally being from 0 to 150° C. and preferably between 20 and 80° C. The reaction pressure can vary from subatmospheric to several atmospheres, i.e., from 0.2 to 20 atmospheres, although atmospheric pressure reactions are convenient. The degree of completeness of the reaction can be determined by analysis of the reaction mixture. The reaction generally requires from one tenth to ten hours and preferably from one half to three hours, depending upon the ratio of reactants, the particular reactants and solvents employed and the temperature and pressure of the reaction.

The process of the invention is illustrated in detail by the following examples.

EXAMPLE I

A solution of 3.9 g. (0.0135 mole)

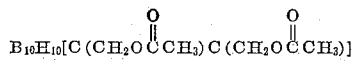

25 ml. (0.62 mole) of methanol, 4 g. (0.071 mole) of potassium hydroxide and 4 ml. of water was allowed to stand at room temperature for 4 hrs. and was then heated at 60° C. for 20 minutes. The cooled solution was poured into water and the resulting solution was made slightly acidic. The precipitate was collected and crystallized from heptane (about 300 ml.). The product was 2 g. (75 percent) of colorless crystals which did not melt up to 300° C. The material was found to contain 52.0, 52.5 percent boron, 24.7, 24.6, 24.3 percent carbon, and 8.5, 9.0, 8.3 percent hydrogen as compared to the theoretical value of 52.8 percent boron, 23.6 percent carbon and 7.8 percent hydrogen calculated for the compound $$B_{10}H_{10}[C(CH_2OH)C(CH_2OH)]$$

EXAMPLE II 2.0 g. (0.092 mole) of

were dissolved in approximately 20 ml. of saturated methanolic potassium hydroxide. Water was slowly added until cloudiness appeared and then enough methanol was added to clear the solution. The mixture was refluxed for 20 minutes and then poured into cold water and a white precipitate formed which was removed and dried in a vacuum desiccator and then under vacuum at 100° C. for 2 hours. The product was found to contain 21.0, 21.1 percent carbon and 8.14, 8.24 percent hydrogen, which compare with the values of 20.7 percent carbon and 8.0 percent hydrogen calculated for the compound $B_{10}H_{10}(CHCCH_2OH)$, which structure is consistent with the results of infrared analysis.

EXAMPLE III

The experiment of Example II was repeated except that the water solution after quenching the reaction was acidified, resulting in formation of more product. In this case, 6 g. of the organoboron acetate gave 4.3 g. (89 percent) of the alcohol.

This organoboron alcohol is soluble in ether, benzene, hexane and pentane and may be recrystallized from pentane nicely. It does not melt upon slow heating up to 300° C., but will melt if dropped on a block preheated to 250 to 300° C.

EXAMPLE IV

A solution of 24.6 g. (0.085 mole) of

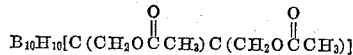

25 g. (0.45 mole) of potassium hydroxide, 30 ml. of water and 150 ml. of methanol was allowed to stand at room temperature for 4 hours and then poured into 300 ml. of 3 N hydrochloric acid. The precipitate was removed by filtration and was dried in air. Excess water was removed by dissolving the solid in 100 ml. of hot benzene and separating the layers. 150 ml. of heptane were then added. The mixture was boiled, filtered and cooled. A colorless solid was obtained; 12.3 g. (70.7 percent), melting point 298 to 301° C. Evaporation of the solvent to 50 ml. gave an additional 0.46 g. of product.

EXAMPLE V 4 g. (0.071 mole) of potassium hydroxide were dissolved in 25 ml. (0.62 mole) of methyl alcohol and a few milliliters of water. 3 g. (0.013 mole)

were added. The mixture was stirred at room temperature for ½ hour and heated to 60 to 70° C. for 45 minutes. After cooling, the mixture was poured into water. The cloudy mixture was acidified with HCl. An oil, which formed on top of the water mixture, was extracted 4 times with ether. The combined ether layers were washed with water and dried over magnesium sulfate. The ether was evaporated. The product appeared to be a mixture of an orange oil and a solid. Mass spectrometric analysis indicated that $B_{10}H_{10}(CHCCHCH_3OH)$ was present.

EXAMPLE VI 8 g. of KOH were dissolved in 10 ml. of water and the solution was added to 50 ml. of methanol. This solution was cooled to about 10° C. and 8 g. of the organoboron ester of Example IV were added. The mixture stood for 2¼ hours and was then poured into 200 ml. of water. The water solution was acidified with HCl and the precipitate was collected by suction filtration and washed well with water. During the filtration, methanol distilled from the filtrate and more diol precipitated. The combined precipitate weighed 4.9 g. (85%). The white powder was crystallized from about 500 ml. of heptane to give 4.4 g. (77%) of white crystals.

EXAMPLE VII

The experiment of Example VI was repeated and the reaction mixture was allowed to stand for 1½ hours. The yield of diol was the same.

The compound of the formula $B_{10}H_{10}(CHCCH_2OH)$ prepared as described in Examples II and III has the same structural formula as shown in the accompanying drawing with the exception that the hydrogen atom indicated by a single asterisk is replaced by the radical

—$CH_2OH$

The compound of the formula

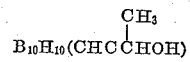

prepared as described in Example V has the same structural formula as shown in the accompanying drawing with the exception that the hydrogen atom indicated by a single asterisk is replaced by the radical

The compound of the formula $$B_{10}H_{10}[C(CH_2OH)C(CH_2OH)]$$

prepared as described in Examples I, IV, VI and VII has the same structural formula as shown in the accompanying drawing with the exception that the hydrogen atoms indicated by the single and double asterisk are each replaced by the radical —$CH_2OH$.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a boro-hydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600° to 1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as air-craft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operation with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvement in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

We claim:

1. A method for the production of an organoboron alcohol compound useful as a fuel which comprises hydrolyzing by reaction with a lower alkanol solution of an alkali metal hydroxide a compound of the class $$RR'B_{10}H_8(CR''CR''')$$

wherein R and R' are each selected from the class consisting of hydrogen and an alkyl radical containing from one to five carbon atoms, wherein R'' and R''' are each selected from the class consisting of hydrogen, an alkyl radical, and radicals of the class

wherein $R_1$ is a bivalent saturated hydrocarbon radical containing 1 to 8 carbon atoms and $R_2$ is selected from the class consisting of a benzyl radical and alkyl radicals containing 1 to 6 carbon atoms, at least one radical of the class

being present, the total number of carbon atoms in the $R_1$ radical portion of R'' and R''' taken together not exceeding eight.

2. The method of claim 1 wherein the lower alkanol is methanol.

3. The method of claim 1 wherein the alkali metal hydroxide is potassium hydroxide.

4. The method of claim 1 wherein the lower alkanol is methanol and the alkali metal hydroxide is potassium hydroxide.

5. The method of claim 1 wherein said compound which is reacted is

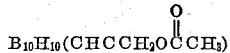

6. The method of claim 1 wherein said compound which is reacted is

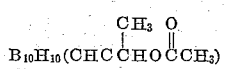

7. The method of claim 1 wherein said compound which is reacted is

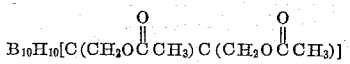

8. The method of claim 4 wherein said compound which is reacted is

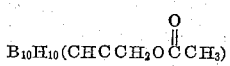

9. The method of claim 4 wherein said compound which is reacted is

10. The method of claim 4 wherein said compound which is reacted is

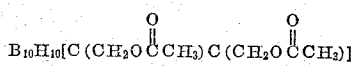

11. $RR'B_{10}H_8(CR''CR''')$ wherein R and R' are each selected from the class consisting of hydrogen and an alkyl radical containing from 1 to 5 carbon atoms and wherein R'' and R''' are selected from the class consisting of hydrogen, an alkyl radical, and hydroxyalkyl radicals, at least one hydroxyalkyl radical being present, and the total number of carbon atoms in R'' and R''' together not exceeding 8.

12. $B_{10}H_{10}(CHCCH_2OH)$.

13. $B_{10}H_{10}(CHC\overset{CH_3}{\underset{|}{C}}HOH)$

14. $B_{10}H_{10}[C(CH_2OH)C(CH_2OH)]$

No references cited.

TOBIAS E. LEVOW, *Primary Examiner.*

LEON D. ROSDOL, CARL D. QUARFORTH,
*Examiners.*